(12) United States Patent
Hong

(10) Patent No.: US 12,546,996 B2
(45) Date of Patent: Feb. 10, 2026

(54) NEAR-EYE DISPLAY DEVICE AND NEAR-EYE DISPLAY METHOD

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 404 days.

(21) Appl. No.: 18/116,814

(22) Filed: Mar. 2, 2023

(65) Prior Publication Data

US 2023/0204954 A1    Jun. 29, 2023

Related U.S. Application Data

(63) Continuation-in-part of application No. 16/763,368, filed as application No. PCT/CN2019/113076 on Oct. 24, 2019, now Pat. No. 11,624,915.

(30) Foreign Application Priority Data

Jan. 18, 2019  (CN) .......................... 201910048296.7

(51) Int. Cl.
*G02B 27/01*    (2006.01)
*G02B 5/30*    (2006.01)
(Continued)

(52) U.S. Cl.
CPC ....... *G02B 27/0101* (2013.01); *G02B 5/3083* (2013.01); *G02B 27/0093* (2013.01); *G02F 1/294* (2021.01); *G02B 2027/0134* (2013.01)

(58) Field of Classification Search
CPC .. G02B 27/0101; G02B 27/0093; G02F 1/294
(Continued)

(56) References Cited

U.S. PATENT DOCUMENTS 10,311,615 B2    6/2019  Ko et al.
10,895,746 B1 *  1/2021  Trail ................. G02B 27/0025
(Continued)

FOREIGN PATENT DOCUMENTS

CN    107870715 A    4/2018
CN    108347597 A    7/2018
(Continued)

OTHER PUBLICATIONS

Translation of CN_109100866_A (Year: 2025).*
(Continued)

*Primary Examiner* — Jerry L Brooks
(74) *Attorney, Agent, or Firm* — Chiwin Law LLC

(57) ABSTRACT

A near-eye display device and a near-eye display method are provided. In the near-eye display device and method, displaying a first image and a second image in different time periods by using a display portion; converting light of the first image to first linearly polarized light and converting light of the second image to second linearly polarized light by using a polarization conversion portion, a polarization direction of the first linearly polarized light being different from that of the second linearly polarized light; receiving the first linearly polarized light and the second linearly polarized light, and causing them to be emitted towards different directions by using a polarization splitting portion; and transmitting the first linearly polarized light and transmitting the second linearly polarized light by using an image light transmission portion. It can solve the problem of fatigue and dizziness of user's eyes.

19 Claims, 7 Drawing Sheets

(51) Int. Cl.
  *G02B 27/00* (2006.01)
  *G02F 1/29* (2006.01)
(58) Field of Classification Search
  USPC .......................................................... 359/630
  See application file for complete search history.

(56) References Cited

U.S. PATENT DOCUMENTS

| | | | |
|---|---|---|---|
| 11,624,915 B2 * | 4/2023 | Hong | ................ G02B 27/0172 |
| | | | 359/630 |
| 2011/0032485 A1 | 2/2011 | Hsiung | |
| 2017/0336628 A1 | 11/2017 | Kim et al. | |
| 2018/0089871 A1 | 3/2018 | Ko et al. | |
| 2018/0210222 A1 | 7/2018 | Seo et al. | |
| 2019/0293965 A1 | 9/2019 | Liao | |
| 2020/0150429 A1 | 5/2020 | Hong | |

FOREIGN PATENT DOCUMENTS

| | | | | |
|---|---|---|---|---|
| CN | 108572453 A | | 9/2018 | |
| CN | 109100866 A | * | 12/2018 | ......... G02B 27/0101 |
| CN | 109188700 A | | 1/2019 | |
| CN | 109613705 A | | 4/2019 | |
| WO | 02091062 A1 | | 11/2002 | |

OTHER PUBLICATIONS

First Office Action of the corresponding CN201910048296.7 with English translation.
Non-final office action of U.S. Appl. No. 16/763,368, dated Aug. 17, 2022.
Notice of Allowance of U.S. Appl. No. 16/763,368, dated Dec. 7, 2022.
ISR and Written Opinion of corresponding PCT/CN2019/113076, in Chinese & English Translation.

* cited by examiner

NEAR-EYE DISPLAY DEVICE AND NEAR-EYE DISPLAY METHOD

CROSS-REFERENCE TO RELATED APPLICATION

The application is a continuation-in-part application of U.S. Ser. No. 16/763,368 filed on May 12, 2020, which is a national stage application of international application PCT/CN 2019/113076 filed on Oct. 24, 2019 which claims priority of the Chinese patent application No. 201910048296.7, filed on Jan. 18, 2019, the entire disclosure of which are incorporated herein by reference as part of the present application.

TECHNICAL FIELD

At least one embodiment of the present disclosure relates to a near-eye display device and a near-eye display method.

BACKGROUND

In the field of near-eye display, when an augmented reality (AR) device (e.g., Hololens from Microsoft) is worn by a user, a three-dimensional (3D) object as displayed is a stereoscopic vision formed by displaying different images for a left eye and a right eye of the user, respectively.

SUMMARY

At least one embodiment of the present disclosure relates to a near-eye display device and a near-eye display method.

At least one embodiment of the present disclosure provides a near-eye display device, which includes: a display portion, configured to display a first image in a first time period and display a second image in a second time period; a polarization conversion portion, configured to convert light of the first image to first linearly polarized light, and convert light of the second image to second linearly polarized light, a polarization direction of the first linearly polarized light being different from a polarization direction of the second linearly polarized light; a polarization splitting portion, configured to receive the first linearly polarized light and the second linearly polarized light, cause the first linearly polarized light to be emitted towards a first direction and cause the second linearly polarized light to be emitted towards a second direction, the first direction being different from the second direction; and an image light transmission portion, configured to transmit the first linearly polarized light in the first time period, and configured to transmit the second linearly polarized light in the second time period.

For example, the display portion, the polarization conversion portion and the image light transmission portion are disposed sequentially.

For example, the device further includes a projection portion, the projection portion is located between the display portion and the polarization conversion portion; the projection portion is configured to project the first linearly polarized light and the second linearly polarized light; and the polarization splitting portion is configured to receive the first linearly polarized light and the second linearly polarized light as projected by the projection portion.

The image light transmission portion is configured to transmit the first linearly polarized light in the first time period and form a first virtual image located in a first image surface, and is configured to transmit the second linearly polarized light in the second time period and form a second virtual image located in a second image surface; the first image surface is different from the second image surface; and an extension line of a connecting line of centers of the first virtual image and the second virtual image passes through the polarization splitting portion.

For example, the first virtual image and the second virtual image are focused to a same focus position; a distance from the first virtual image to the focus position is greater than 1 m and is smaller than 10 m; and a distance from the second virtual image to the focus position is greater than 1 m and is smaller than 10 m.

For example, a viewing angle of the first virtual image and a viewing angle of the second virtual image both are greater than 40°.

For example, the first image surface is parallel to the second image surface.

For example, the polarization splitting portion includes a light incoming surface configured to receive the first linearly polarized light and the second linearly polarized light; the image light transmission portion includes a first image light transmission sub-portion and a second image light transmission sub-portion, the first image light transmission sub-portion and the second image light transmission sub-portion are disposed at two sides of the polarization splitting portion, respectively; the first image light transmission sub-portion is located at a side of the polarization splitting portion where the light incoming surface is located, and the second image light transmission sub-portion is located at a side of the polarization splitting portion opposite to the light incoming surface; the extension line of the connecting line of centers of the first virtual image and the second virtual image passes through the first image light transmission sub-portion.

For example, the first image light transmission sub-portion includes a first phase retarder and a first reflective surface, the first phase retarder is closer to the polarization splitting portion than the first reflective surface to the polarization splitting portion; the first phase retarder is configured to receive the first linearly polarized light emitted towards the first direction and convert the first linearly polarized light to first circularly polarized light; the first reflective surface is configured to reflect the first circularly polarized light and convert the first circularly polarized light to second circularly polarized light; the first phase retarder is further configured to receive the second circularly polarized light and convert the second circularly polarized light to third linearly polarized light; the third linearly polarized light is transmitted through the polarization splitting portion to form the first virtual image located in the first image surface; the second image light transmission sub-portion includes a second reflective surface and a second phase retarder, the second phase retarder is closer to the polarization splitting portion than the second reflective surface to the polarization splitting portion; the second phase retarder is configured to receive the second linearly polarized light emitted towards the second direction and convert the second linearly polarized light to third circularly polarized light; the second reflective surface is configured to reflect the third circularly polarized light and convert the third circularly polarized light to fourth circularly polarized light; the second phase retarder is further configured to receive the fourth circularly polarized light and convert the fourth circularly polarized light to fourth linearly polarized light; the fourth linearly polarized light is reflected by the polarization splitting portion to form the second virtual image located in the second image surface.

For example, a focal power of the first reflective surface is different from a focal power of the second reflective surface.

For example, a reflectivity of the first reflective surface is as same as a reflectivity of the second reflective surface.

For example, an included angle between the first phase retarder and the polarization splitting portion is an acute angle; an included angle between the second phase retarder and the polarization splitting portion is an acute angle.

For example, the device further includes a transflective portion, the transflective portion is configured to transmit ambient light, the transflective portion includes a first transflective sub-portion and a second transflective sub-portion, the first reflective surface is located between the first transflective sub-portion and the second transflective sub-portion, and a refractivity of the first transflective sub-portion is as same as a refractivity of the second transflective sub-portion.

For example, the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light.

For example, both the first linearly polarized light and the fourth linearly polarized light are S-polarized light, and both the second linearly polarized light and the third linearly polarized light are P-polarized light.

At least one embodiment of the present disclosure further provides a near-eye display method, which includes: displaying a first image in a first time period and displaying a second image in a second time period, by using a display portion; converting light of the first image to first linearly polarized light, and converting light of the second image to second linearly polarized light, by using a polarization conversion portion, a polarization direction of the first linearly polarized light being different from a polarization direction of the second linearly polarized light; receiving the first linearly polarized light and the second linearly polarized light, causing the first linearly polarized light to be emitted towards a first direction and causing the second linearly polarized light to be emitted towards a second direction, by using a polarization splitting portion, the first direction being different from the second direction; and transmitting the first linearly polarized light in the first time period and transmitting the second linearly polarized light in the second time period, by using an image light transmission portion.

For example, transmitting the first linearly polarized light in the first time period to form a first virtual image located in a first image surface, and transmitting the second linearly polarized light in the second time period to form a second virtual image located in a second image surface, by using the image light transmission portion; the first image surface is different from the second image surface; and an extension line of a connecting line of centers of the first virtual image and the second virtual image passes through the polarization splitting portion.

For example, the method further includes projecting the first linearly polarized light and the second linearly polarized light, by using a projection portion; and receiving the first linearly polarized light and the second linearly polarized light as projected by the projection portion, by using the polarization splitting portion.

For example, the method further includes: providing a transflective portion to transmit ambient light.

For example, the method further includes: receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder, wherein the third linearly polarized light is transmitted through the polarization splitting portion to form the first virtual image located in the first image surface; receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder, wherein the fourth linearly polarized light is reflected by the polarization splitting portion to form the second virtual image located in the second image surface; the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

Figure 1:
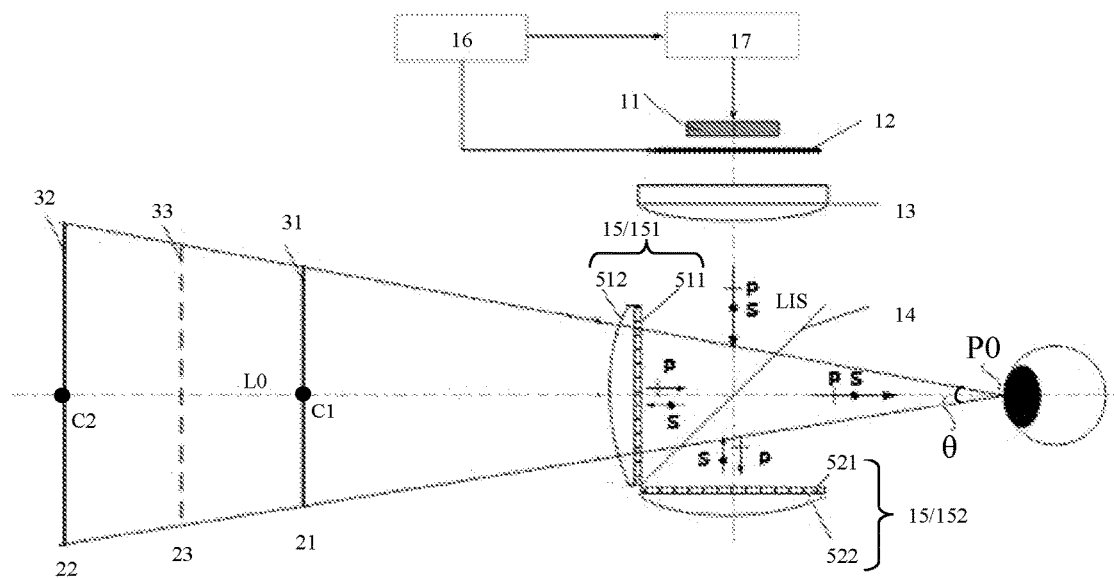
FIG. 1 is a schematic diagram of a near-eye display device provided by an embodiment of the present disclosure.

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the described object is changed, the relative position relationship may be changed accordingly.

Because 3D display based on binocular stereoscopic vision involves problems of convergence-adjusting conflict, long wear thereof may cause fatigue and dizziness of user's eyes, which is an issue to be urgently solved in stereoscopic display. Light field display provides one of feasible methods for solving the fatigue and dizziness issue of user's eyes. That is, realizing natural 3D display by simulating a light field of a natural 3D object to mitigate fatigue and dizziness of human eyes. Apart from holographic display, methods for realizing light field display mainly include integral imaging display by adopting a micro-lens array, and also include multi-screen display by adopting a multilayered display screen.

Light field imaging technology is capable of simulating the law of the natural world, so that an observer observes a vivid 3D image. The light field imaging technology mainly utilizes two methods of space multiplexing and time multiplexing, in which the space multiplexing method is to realize 3D display effect by imaging an image onto different focus positions, while the time multiplexing method mainly utilizes high-speed elements to quickly generate different focus positions for the image, so that the observer can feel simultaneous occurrence of the image at different focus positions due to the persistence of vision, thereby realizing 3D display effect.

FIG. 1 is a schematic diagram of a near-eye display device provided by an embodiment of the present disclosure. An embodiment of the present disclosure provides a near-eye display device, as illustrated in FIG. 1, including a display portion 11, a polarization conversion portion 12, a projection portion 13, a polarization splitting portion 14 and an image light transmission portion 15.

The display portion 11 is configured to display a first image in a first time period and display a second image in a second time period.

The polarization conversion portion 12 is configured to convert light of the first image to first linearly polarized light, and convert light of the second image to second linearly polarized light; a polarization direction of the first linearly polarized light is different from a polarization direction of the second linearly polarized light.

The projection portion 13 is configured to project the first linearly polarized light and the second linearly polarized light.

The polarization splitting portion 14 is configured to receive the first linearly polarized light and the second linearly polarized light as projected by the projection portion 13, cause the first linearly polarized light to be emitted towards a first direction and cause the second linearly polarized light to be emitted towards a second direction; and the first direction is different from the second direction.

The image light transmission portion 15 is configured to transmit the first linearly polarized light in the first time period and configured to transmit the second linearly polarized light in the second time period.

For example, the image light transmission portion 15 is configured to transmit the first linearly polarized light in the first time period and form a first virtual image 31 located in a first image surface 21, and is configured to transmit the second linearly polarized light in the second time period and form a second virtual image 32 located in a second image surface 22; the first image surface 21 is different from the second image surface 22; and an extension line of, a connecting line L0 of a center C1 of the first virtual image 31 and a center C2 of the second virtual image 32, passes through the polarization splitting portion 14.

In the embodiment of the present disclosure, the extension line of the connecting line L0 of the center C1 of the first virtual image 31 and the center C2 of the second virtual image 32 passes through the polarization splitting portion 14, which facilitates to realize near-eye display. In near-eye display, a near-eye display device is very close to the eye. For example, a distance from the eye to the near-eye display device is not greater than 10 cm, further, for example, not greater than 5 cm, without limited thereto. For example, in the embodiment of the present disclosure, the near-eye display device is a binocular near-eye display device, and the eye in FIG. 1 may be a left eye or a right eye.

For example, as illustrated in FIG. 1, the display portion 11, the polarization conversion portion 12, the projection portion 13 and the image light transmission portion 15 are disposed sequentially.

For example, the first time period and the second time period constitute one display cycle, and the display cycle is smaller than a refresh time of human eyes. Generally, the refresh time of human eyes is 1/30 second.

The near-eye display device provided by the embodiment of the present disclosure utilizes the time multiplexing method to display the first image and the second image at different time moments, and convert light of the first image and light of the second image through different light paths, respectively, to form the first virtual image 31 and the second virtual image 32, respectively, thereby realizing natural 3D display based on light field.

As illustrated in FIG. 1, a distance from the first virtual image 31 to the human eye is different from a distance from the second virtual image 32 to the human eye. A perceived image 33 obtained by a deep merge of the first virtual image 31 and the second virtual image 32 is located in a third image surface 23, and the third image surface 23 is located between the first image surface 21 and the second image surface 22. When images are successively displayed, the difference between the images as displayed allows the perceived image surface 23 of the perceived image 33 to be changed between the first image surface 21 and the second image surface 22, so that the near-eye display device provided by the embodiment of the present disclosure can solve the problem of fatigue and dizziness of user's eyes. The near-eye display device based on light field display as provided by the embodiment of the present disclosure can provide an adjustment of eye focus within a certain depth range and can present natural 3D image, so that the image is displayed more vividly and eye fatigue caused by long-time observation can be avoided.

It should be explained that, in the embodiment of the present disclosure, the center C1 of the first virtual image 31, the center C2 of the second virtual image 32, the connecting line L0 of the center C1 of the first virtual image 31 and the center C2 of the second virtual image 32, the extension line of the connecting line L0 or the like are all virtual points or lines but are not really existed. The introduction of these virtual points or lines is for the purpose of clearly describing positions of the first virtual image 31 and the second virtual image 32, as well as positional relationships between the first virtual image 31, the second virtual image 32 and other elements.

For example, both the first virtual image 31 and the second virtual image 32 are enlarged images, the first virtual image 31 is an enlarged image of the first image and the second virtual image 32 is an enlarged image of the second image. For example, the first virtual image and the second virtual image 32 are enlarged by different scales.

For example, the center C1 of the first virtual image 31 may be a center of a pattern enclosed by an edge of the first virtual image 31. The center C2 of the second virtual image 32 may be a center of a pattern enclosed by an edge of the second virtual image 32, without limited thereto.

For example, the first linearly polarized light has a first polarization direction, the second linearly polarized light has a second polarization direction, and the first polarization direction is perpendicular to the second polarization direction. That is, the polarization direction of the first linearly polarized light is perpendicular to the polarization direction of the second linearly polarized light. For example, the first linearly polarized light is S-polarized light, and the second linearly polarized light is P-polarized light, without limited thereto.

For example, as illustrated in FIG. 1, the polarization splitting portion 14 includes a light incoming surface LIS which receives the first linearly polarized light and the second linearly polarized light. When light is incident on the light incoming surface LIS of the polarization splitting portion 14 at a non-vertical angle, the reflective characteristic and transmissive characteristic both are relied on the polarized phenomenon. Under such circumstances, a coordinate system as used is defined by a plane containing incident light and reflected light. If a polarization vector of light is located in this plane, the light is referred to as P-polarized light; if the polarization vector is perpendicular to this plane, the light is referred to as S-polarized light. Any incident, polarization state may be expressed as a vector sum of a S-component and a P-component. Linearly polarized light with P-polarization state may be referred to as P-polarized light, and linearly polarized light with S-polarization state may be referred to as S-polarized light.

For example, the polarization splitting portion 14 can reflect S-polarized light and transmit P-polarized light. Of course, the polarization splitting portion 14 can also reflect P-polarized light and transmit S-polarized light. That is, the polarization splitting portion 14 can be configured to reflect one of S-polarized light and P-polarized light and transmit the other one of S-polarized light and P-polarized light. The use of the polarization splitting portion 14 facilitates to fold the light path, and facilitates to reduce an entire size of the near-eye display device.

For example, particular arrangement of the polarization splitting portion 14 may be set according to actual demands, without particularly limited in the embodiment of the present disclosure. For example, the polarization splitting portion 14 may be a polarization beam splitting prism which can reflect S-polarized light (e.g., at a reflectivity greater than 90%), and transmit P-polarized light (e.g., at a transmittance greater than 90%). For example, the polarization splitting portion 14 may also be a wire grid polarizer. The wire grid polarizer can include a plurality of metal wires parallel to each other, and a width of each of the metal wires and a space between adjacent metal wires both are in an order of nanometer. When incident light is irradiated on the wire grid polarizer, the linearly polarized light with a polarization direction parallel to an extension direction of the metal wire is reflected, while the linearly polarized light with a polarization direction perpendicular to the extension direction of the metal wire is transmitted.

The near-eye display device provided by the embodiment of the present disclosure utilizes the time multiplexing method to convert light carried with image information to S-polarized light and P-polarized light according to a time sequence by cooperating with the polarization conversion portion, and to allow the S-polarized light and P-polarized light to be incident onto the polarization splitting portion by the projection portion; these two types of polarized light enter two different light paths, respectively, through the polarization splitting portion, pass through the phase retarder for two times and are reflected by the first reflective surface and the second reflective surface, respectively, and then enter the human eyes after passing through the polarization splitting portion again.

For example, the polarization conversion portion 12 is disposed in a transmission path of light of the first image and light of the second image. The polarization conversion portion 12 may be in two different conversion states. For example, when the polarization conversion portion 12 is in a first conversion state, it's configured to receive the light of the first image and converts the light of the first image to first linearly polarized light. When the polarization conversion portion 12 is in a second conversion state, it's configured to receive the light of the second image and converts the light of the second image to second linearly polarized light.

For example, the polarization conversion portion 12 may include one wire grid polarizer and one rotating motor, the wire grid polarizer may be disposed on the rotating motor. In the case where the display portion 11 displays the first image, rotating the wire grid polarizer by the rotating motor to bring the wire grid polarizer to the first conversion state so that the light of the first image is converted to first linearly polarized light. In the case where the display portion 11 displays the second image, rotating the wire grid polarizer by the rotating motor to bring the wire grid polarizer to the second conversion state so that the light of the second image is converted to second linearly polarized light.

For another example, the polarization conversion portion 12 may also include two wire grid polarizers and two rotating motors, and transmission axes of the two wire grid polarizers are perpendicular to each other. By adjusting positions of the two wire grid polarizers through the rotating motors, the polarization conversion portion 12 is brought into the first conversion state or the second conversion state. It should be explained that, particular arrangement of the polarization conversion portion 12 may be set according to actual demands, without particularly limited in the embodiment of the present disclosure.

The near-eye display device provided by the embodiment of the present disclosure realizes forming virtual images, from two types of polarized light, on a first image surface and a second surface, respectively, which are spaced apart by a certain distance by introducing the polarization conversion portion and by using the time multiplexing method, so as to realize natural, light field 3D display by deep merge. Such light field display device is capable of vividly displaying 3D objects and provides image information with different depths, so that a focal distance of user's eyes can be adjusted, and discomfort of human's eyes due to long-time focus on a same plane can be avoided.

For example, the first image and the second image as displayed by the display portion may be the same, and may also be different. When the first image is different from the second image, it's more useful for the perceived image surface to be changed, and is more useful for mitigating visual fatigue.

For example, in order to facilitate the deep merge of the first virtual image and the second virtual image, the first image surface 21 is parallel to the second image surface 22.

For example, as illustrated in FIG. 1, the first virtual image 31 and the second virtual image 21 are focused onto a same focus position P0. For example, a distance from the first virtual image 31 to the focus position is greater than 1 m and is smaller than 10 m; further, for example, the distance is greater than 2 m and is smaller than 4 m. For example, a distance from the second virtual image 32 to the focus position is greater than 1 m and is smaller than 10 m; further, for example, the distance is greater than 2 m and is smaller than 4 m. For example, the focus position is a position where the human eye is located. In this way, the distance from the focus position to the near-eye display device may also be referred to the above-mentioned distance from the eye to the near-eye display device, without repeatedly described herein. For example, as illustrated in FIG. 1, the first virtual image 31 is closer to the focus position P0 than the second virtual image 32 to the focus position P0.

For example, the projection portion 13 is configured to enlarge the first image and the second image to facilitate improving the display effect of the near-eye display device, and facilitate increasing the viewing angle. For example, as illustrated in FIG. 1, the viewing angle θ of the first virtual image 31 and the second virtual image 32 is greater than 40°. For example, the viewing angle θ of the first virtual image 31 and the second virtual image 32 is smaller than or equal to 60°. Further, for example, the viewing angle of the first virtual image 31 and the second virtual image 32 is greater than 45° and smaller than 60°. The projection portion 13 is configured to enlarge the first image and the second image according to scales. For example, the first image and the second image are enlarged by a same scale. For example, the projection portion 13 may be a projection lens which plays a role of enlarging the image, like a projector. For example, in some embodiments, the projection portion 13 may not be provided, and the polarization splitting portion 14 is configured to receive the first linearly polarized light and the second linearly polarized light. Under such circumstance, the display portion 11, the polarization conversion portion 12 and the image light transmission portion 15 are disposed sequentially.

For example, as illustrated in FIG. 1, for sake of clarity, only one convex lens is shown to represent the projection portion 13, without limited thereto. The projection portion 13 may include a convex lens, a concave lens or a combination thereof; and the amount of the convex lens and the concave lens may be set according to actual demands. The structure of the projection portion 13 may be determined according to actual demands.

In some other embodiments, the projection portion 13 may be configured to shrink the first image and the second image, respectively, according to scales.

For example, the image light transmission portion 15 includes a first image light transmission sub-portion 151 and a second image light transmission sub-portion 152; the first image light transmission sub-portion 151 and the second image light transmission sub-portion 152 are disposed at two sides of the polarization splitting portion 14, respectively; the first image light transmission sub-portion 151 is located at a side of the polarization splitting portion 14 where the light incoming surface LIS is located, and the second image light transmission sub-portion 152 is located at a side of the polarization splitting portion 14 opposite to the light incoming surface; and the extension line of the connecting line of centers of the first virtual image 31 and the second virtual image 32 passes through the first image light transmission sub-portion 151.

For example, as illustrated in FIG. 1, the display portion 11 and the second image light transmission sub-portion 152 are disposed opposite to each other. For example, an included angle between the display portion 11 and the polarization splitting portion 14 is an acute angle. Further, for example, the included angle between the display portion 11 and the polarization splitting portion 14 is 45°.

For example, the display portion 11 may be a displayer adopting Digital Light Procession (DLP) display technology, Liquid Crystal Display (LCD) technology or the like. The display portion 11 may be a micro-displayer, for example, organic light-emitting diode display device or liquid crystal display device, or the like. It should be explained that, the type, arranged position, arranged manner or the like of the display portion 11 may be set according to actual demands, without particularly limited in the embodiment of the present disclosure. For example, in order to meet customization requirements from users and to reduce the cost of the display system, the display portion 11 may be self-provided according to demands of the users.

For example, as illustrated in FIG. 1, the near-eye display device further includes a control unit 16, the control unit 16 may be connected to the polarization conversion portion 12 to control the polarization conversion portion 12. The control unit 16 controls the polarization conversion portion 12 to bring the polarization conversion portion 12 into a first conversion state or a second conversion state. For example, the control unit 16 may adopt a controller including a control circuit, without limited thereto. For example, the control circuit includes a sequential control circuit, without limited thereto.

For example, as illustrated in FIG. 1, the near-eye display device further includes an image rendering unit 17. The image rendering unit 17 is connected to the control unit 16 and the display portion 11, respectively. The control unit 16 is configured to control the image rendering unit 17. The image rendering unit 17 may be configured to generate data of the first image in the first time period, and to generate data of the second image in the second time period. The display portion 11 may be configured to generate the first image based on the data of the first image, and to generate the second image based on the data of the second image. For example, the image rendering unit 17 includes an image rendering circuit.

The control unit 16 controls the image rendering unit 17 to output the data of the required image to the display portion 11 according to the time sequence; the polarization state of the light of the image displayed by the display portion 11 is converted when the image passes through the polarization conversion portion 12 controlled by the control unit 16, so that the light of the displayed image is changed to S-polarized light or P-polarized light depending on the first time period and the second time period and is incident onto the polarization splitting portion, respectively, through the projection portion 13. For example, the image rendering unit 17 transmits the data of the first image and the data of the second image, alternately, to the display portion 11 according to a preset time sequence, so that the display portion 11 displays the first image and the second image alternately.

For example, as illustrated in FIG. 1, the first image light transmission sub-portion 151 includes a first phase retarder 511 and a first reflective surface 512, the first phase retarder 511 is closer to the polarization splitting portion 14 than the first reflective surface 512 to the polarization splitting portion 14; the first phase retarder 511 is configured to receive the first linearly polarized light emitted towards the first direction and convert the first linearly polarized light to first circularly polarized light; the first reflective surface 512 is configured to reflect the first circularly polarized light and convert the first circularly polarized light to second circularly polarized light; the first phase retarder 511 is further configured to receive the second circularly polarized light and convert the second circularly polarized light to third linearly polarized light; the third linearly polarized light is transmitted through the polarization splitting portion 14 to form the first virtual image 31 located in the first image surface 21.

For example, as illustrated in FIG. 1, the second image light transmission sub-portion 152 includes a second reflective surface 522 and a second phase retarder 521, the second phase retarder 521 is closer to the polarization splitting portion 14 than the second reflective surface 522 to the polarization splitting portion 14; the second phase retarder 521 is configured to receive the second linearly polarized light emitted towards the second direction and convert the second linearly polarized light to third circularly polarized light; the second reflective surface 522 is configured to reflect the third circularly polarized light and convert the third circularly polarized light to fourth circularly polarized light; the second phase retarder 521 is further configured to receive the fourth circularly polarized light and convert the fourth circularly polarized light to fourth linearly polarized light; the fourth linearly polarized light is reflected by the polarization splitting portion 14 to form the second virtual image 32 located in the second image surface 22.

For example, the first phase retarder 511 and the second phase retarder 521 both are quarter-wave plates.

For example, as illustrated in FIG. 1, the first reflective surface 512 and the second reflective surface 522 have different focal powers. Because the first reflective surface 512 and the second reflective surface 522 have different focal powers, light with two different polarization states enters the human eyes through two different light paths to form displayed images (the first virtual image and the second virtual image) which are spaced apart by a certain distance and are located in the first image surface and the second image surface, respectively; a deep merge of the images in the two image surfaces realizes light field display.

For example, the focal power represents the capability of the optical element to deflect light. Under the circumstance that a clear aperture of the optical element is given, the focal power is in inverse proportion to the focal distance of the optical element. That is, the smaller the focal distance is, the greater the focal power will be.

For example, the focal power of the first reflective surface 512 is greater than the focal power of the second reflective surface 522. In the embodiment of the present disclosure, reference is made to the case where the focal power of the first reflective surface 512 is greater than the focal power of the second reflective surface 522, by way of example. Of course, the focal power of the first reflective surface 512 may also be smaller than the focal power of the second reflective surface 522. Virtual images located in different image surfaces can be formed as long as the first reflective surface 512 and the second reflective surface 522 have different focal powers.

In order for consistent brightness of the first virtual image and the second virtual image, the first reflective surface 512 and the second reflective surface 522 have the same reflectivity, without limited thereto. The reflectivity of the first reflective surface 512 may also be different from that of the second reflective surface 522.

For example, as illustrated in FIG. 1, an included angle between the first phase retarder 511 and the polarization splitting portion 14 is an acute angle; an included angle between the second phase retarder 521 and the polarization splitting portion 14 is an acute angle. Further, for example, the included angle between the first phase retarder 511 and the polarization splitting portion 14 is 45°; the included angle between the second phase retarder 521 and the polarization splitting portion 14 is 45°. For example, an included angle between the first phase retarder 511 and the second phase retarder 521 is 90°.

For example, the first linearly polarized light and the fourth linearly polarized light have a first polarization direction; the second linearly polarized light and the third linearly polarized light have a second polarization direction; the first polarization direction is perpendicular to the second polarization direction. A rotation direction of the first circularly polarized light is opposite to a rotation direction of the second circularly polarized light; a rotation direction of the third circularly polarized light is opposite to a rotation direction of the fourth circularly polarized light. For example, the rotation direction includes left-handed rotation and right-handed rotation. Each of the circularly polarized light has one rotation direction.

For example, both the first linearly polarized light and the fourth linearly polarized light are S-polarized light, and both the second linearly polarized light and the third linearly polarized light are P-polarized light.

For example, as illustrated in FIG. 1, the center C1 of the first virtual image 31, the center C2 of the second virtual image 32 and a center of the first phase retarder 511 are located in the same straight line, without limited thereto.

Figure 2:
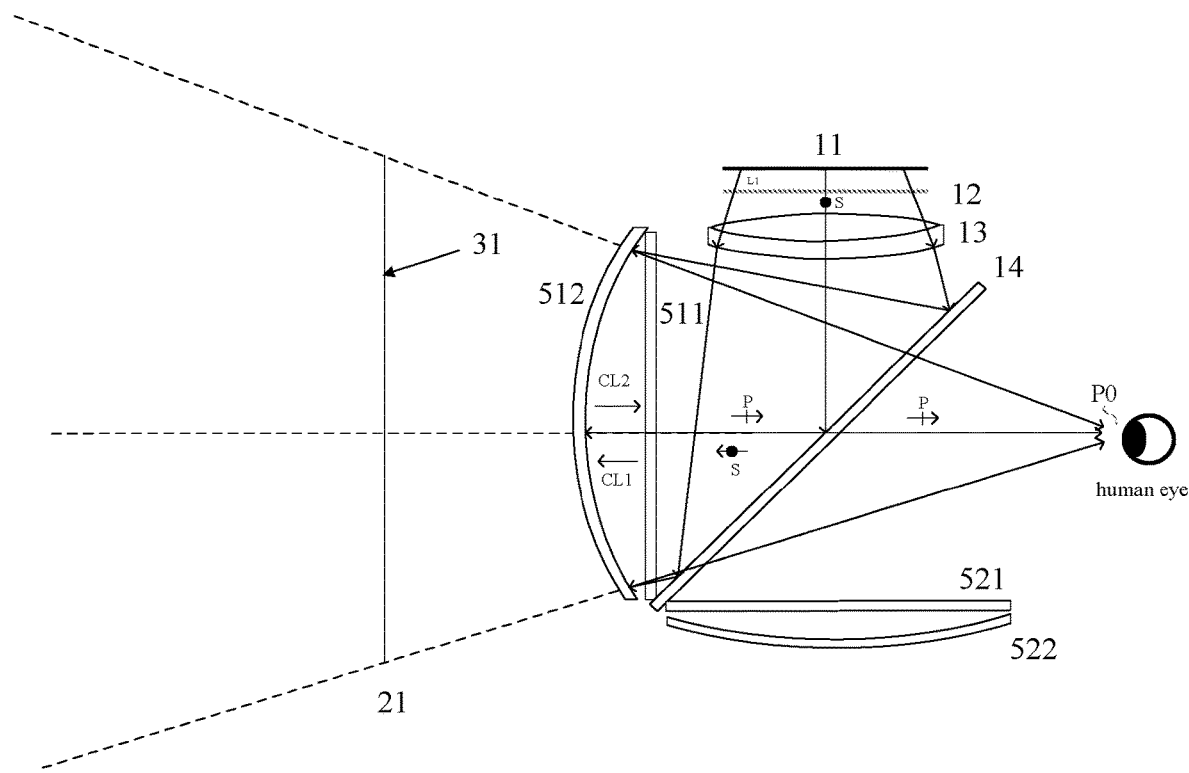
FIG. 2 is a light path diagram illustrating a display portion of a near-eye display device displaying a first image in a first time period, provided by an embodiment of the present disclosure.

FIG. 2 is a light path diagram illustrating a display portion of a near-eye display device displaying a first image in a first time period, provided by an embodiment of the present disclosure. Light L1 of the first image passes through the polarization conversion portion 12 and is converted to S-polarized light; the S-polarized light passes through the projection portion 13 and is projected to the polarization splitting portion 14; the S-polarized light projected to the polarization splitting portion 14 is reflected to pass through the first phase retarder 511 and is converted to first circularly polarized light CL1; the first circularly polarized light CL1 is reflected by the first reflective surface 512 and is converted to second circularly polarized light CL2; a rotation direction of the second circularly polarized light CL2 is different from that of the first circularly polarized light CL1. For example, one of rotation directions of the second circularly polarized light CL2 and the first circularly polarized light CL1 is left-handed rotation, and the other one of rotation directions of the second circularly polarized light CL2 and the first circularly polarized light CL1 is right-handed rotation. The second circularly polarized light CL2 passes through the first phase retarder 511 and is converted to P-polarized light. The P-polarized light is transmitted through the polarization splitting portion 14 and enters human eyes, so that the first virtual image 31 located in the first image surface 21 is observed by the human eyes.

Figure 3:
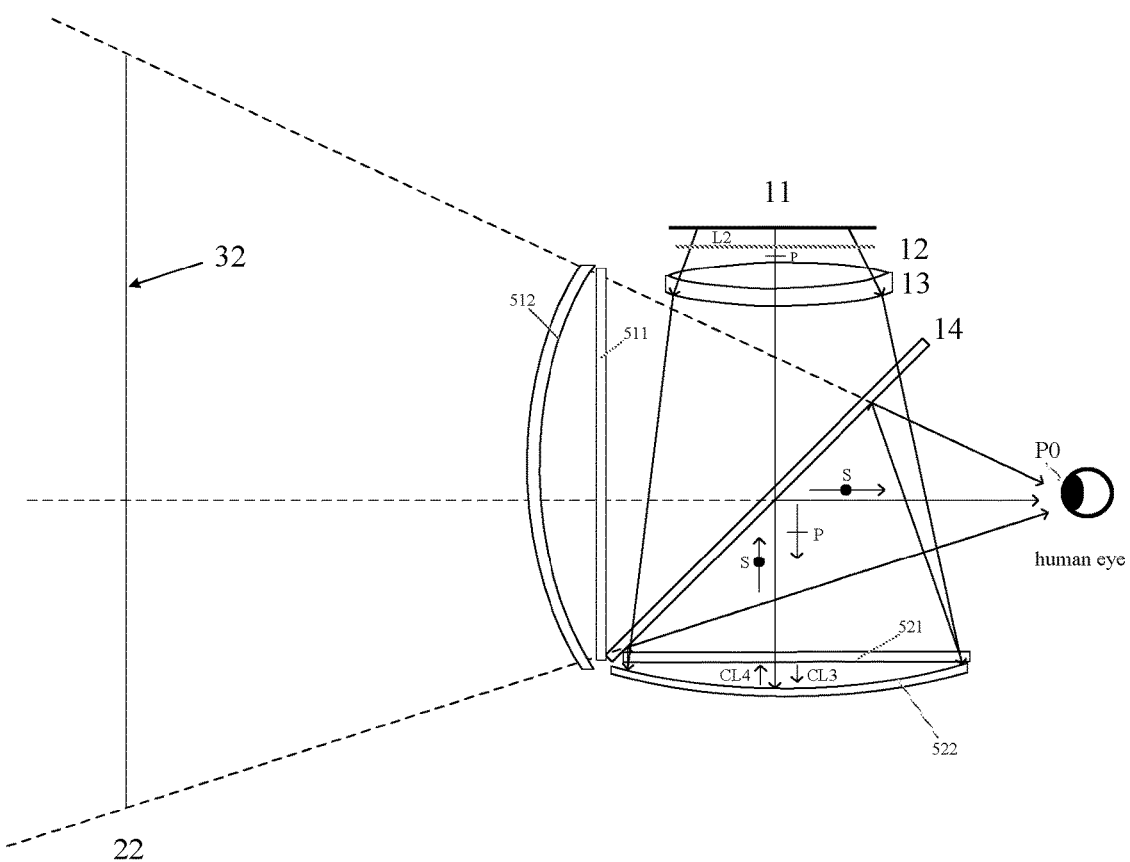
FIG. 3 is a light path diagram illustrating a display portion of a near-eye display device displaying a second image in a second time period, provided by an embodiment of the present disclosure.

FIG. 3 is a light path diagram illustrating a display portion of a near-eye display device displaying a second image in a second time period, provided by an embodiment of the present disclosure. Light L2 of the second image passes through the polarization conversion portion 12 and is converted to P-polarized light; the P-polarized light passes through the projection portion 13 and is projected to the polarization splitting portion 14; the P-polarized light projected to the polarization splitting portion 14 is transmitted through the polarization splitting portion 14, and passes through the second phase retarder 521 to be converted to third circularly polarized light CL3; the third circularly polarized light CL3 is reflected by the second reflective surface 522 and is converted to the fourth circularly polarized light CL4; a rotation direction of the fourth circularly polarized light CL4 is different from that of the third circularly polarized light CL3. For example, one of rotation directions of the third circularly polarized light CL3 and the fourth circularly polarized light CL4 is left-handed rotation, and the other one of rotation directions of the third circularly polarized light CL3 and the fourth circularly polarized light CL4 is right-handed rotation. The fourth circularly polarized light CL4 passes through the second phase retarder 521 and is converted to S-polarized light. The S-polarized light is reflected by the polarization splitting portion 14 and enters human eyes, so that the second virtual image 32 located in the second image surface 22 is observed by the human eyes.

By performing image rendering to the images located in different image surfaces, the first virtual image 31 and the second virtual image 32 are deeply merged to form an image in the perceived image surface, so as to realize light field display.

The near-eye display device provided by an embodiment of the present disclosure utilizes the polarization splitting portion to reduce the size of the device, and utilizes the time multiplexing method to form S-polarized light and P-polarized light having polarization directions perpendicular to each other; in this way, light is propagated in the light path of the near-eye display device without light energy loss, which improves the light transmission efficiency and reduces the power consumption.

FIG. 2 and FIG. 3 illustratively describe the light path of light L1 of the first image and the light path of light L2 of the second image, but the propagation direction of the light L1 of the first image and the propagation direction of the light L2 of the second image are not limited to those illustrated in FIG. 2 and FIG. 3. The light L1 of the first image and the light L2 of the second image further include light having other propagation directions.

As illustrated in FIGS. 1-3, for example, the polarization conversion portion 12 is configured to convert the polarization states of the light of the first image and the light of the second image, while the propagation direction of the light passing through the polarization conversion portion 12 remains unchanged. For example, the polarization conversion portion 12 converts the light of the first image and the light of the second image to have different polarization states. Further, for example, the polarization conversion portion 12 converts the light of the first image and the light of the second image to linearly polarized light having polarization directions perpendicular to each other. For example, the polarization splitting portion 14 modulates the incident light as reflected light or transmitted light according to the polarization state. For example, the propagation direction of the transmitted light transmitted through the polarization splitting portion 14 is as same as the propagation direction of the incident light, and the exiting direction of the reflected light reflected by the polarization splitting portion 14 complies with the law of reflection. For example, the polarization splitting portion 14 is configured to reflect one of S-polarized light and P-polarized light, and to transmit the other one of S-polarized light and P-polarized light. For example, the first phase retarder 511 is configured to convert linearly polarized light to circularly polarized light or convert circularly polarized light to linearly polarized light, and the propagation direction of the light passing through the first phase retarder 511 remains unchanged. For example, the second phase retarder 521 is configured to convert linearly polarized light to circularly polarized light or convert circularly polarized light to linearly polarized light, and the propagation direction of the light passing through the second phase retarder 521 remains unchanged. For example, the first reflective surface 512 is configured to reflect the light incident thereon, and is configured to convert the rotation direction of the circularly polarized light. For example, the first reflective surface 512 convers left-handed, circularly polarized light to right-handed, circularly polarized light; or converts right-handed, circularly polarized light to left-handed, circularly polarized light. For example, the second reflective surface 522 is configured to reflect the light incident thereon, and is configured to convert the rotation direction of circularly polarized light. For example, the second reflective surface 522 convers left-handed, circularly polarized light to right-handed, circularly polarized light; or converts right-handed, circularly polarized light to left-handed, circularly polarized light.

Figure 4:
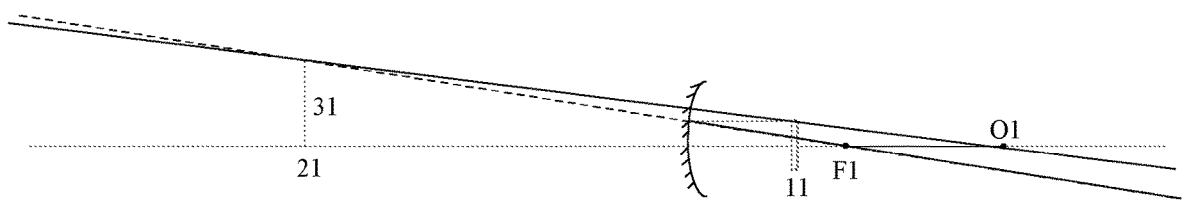
FIG. 4 is an equivalent light path diagram of a near-eye display device provided by an embodiment of the present disclosure in a first time period.

FIG. 4 is an equivalent light path diagram of a near-eye display device provided by an embodiment of the present disclosure in a first time period. The first image is subject to an optical process and then forms the first virtual image 31 at the first image surface 21. FIG. 4 illustrates a focal point F1 and an optic center O1 of an equivalent optical element.

Figure 5:
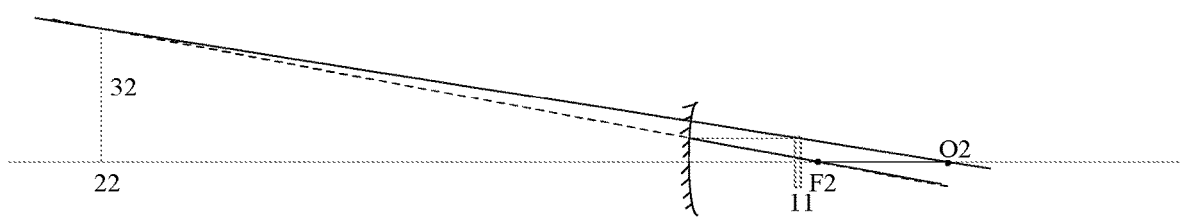
FIG. 5 is an equivalent light path diagram of a near-eye display device provided by an embodiment of the present disclosure in a second time period.

FIG. 5 is an equivalent light path diagram of a near-eye display device provided by an embodiment of the present disclosure in a second time period. The second image is subject to an optical process and then forms the second virtual image 32 at the second image surface 22. FIG. 5 illustrates a focal point F2 and an optic center O2 of an equivalent optical element.

The equivalent light path diagrams of the near-eye display device provided by the embodiment of the present disclosure in the first time period and the second time period are not limited to those illustrated in FIGS. 4-5. FIG. 4 and FIG. 5 illustrate the case where the equivalent optical element is a concave lens, by way of example. For example, the equivalent optical element in the first time period and the second time period may also be a convex lens.

Figure 6:
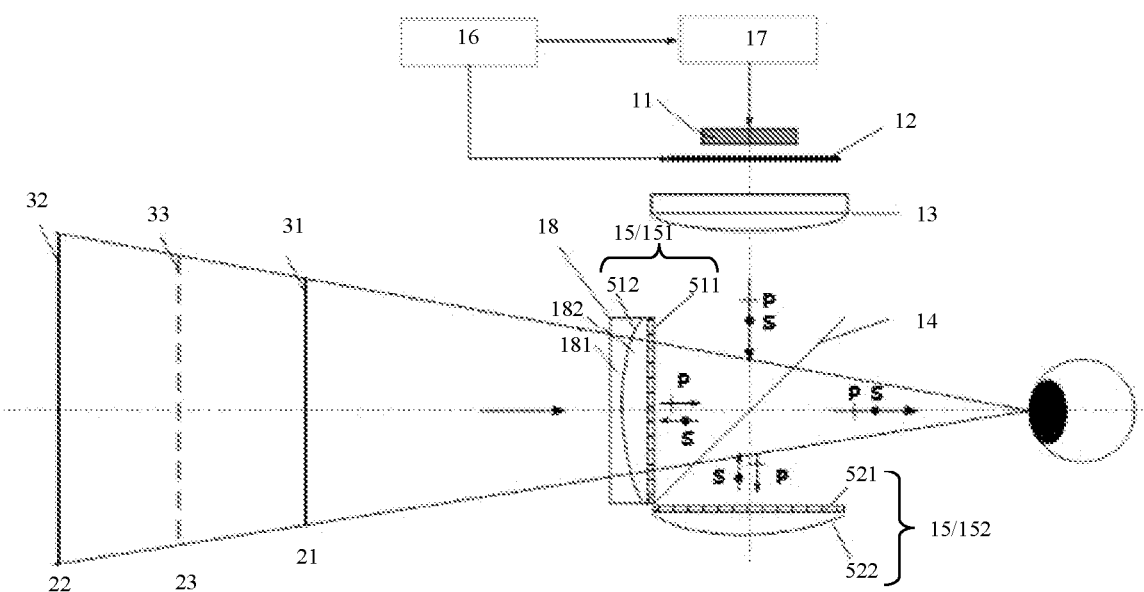
FIG. 6 is a schematic diagram of a near-eye display device provided by another embodiment of the present disclosure.

FIG. 6 is a schematic diagram of a near-eye display device provided by another embodiment of the present disclosure. For example, as illustrated in FIG. 6, the device further includes a transflective portion 18 configured to transmit ambient light. The transflective portion 18 includes a first transflective sub-portion 181 and a second transflective sub-portion 182; the first reflective surface 512 is located between the first transflective sub-portion 181 and the second transflective sub-portion 182; the first transflective sub-portion 181 and the second transflective sub-portion 182 have a same refractivity.

External ambient light passes through the transflective portion consisted of index-matching materials and then enters human eyes. Because the transflective portion 18 containing the first reflective surface has no focal power to the external ambient light, it has no influence to the external ambient light. As a result, the human eyes can simultaneously observe a superposition of a real environment and an image displayed by the light field, so as to realize augmented reality (AR) based on light field display, thereby providing an AR near-eye display device based on light field display.

For example, the transflective portion 18 is consisted of one layer of first reflective surface sandwiched by materials having the same refractivity; the first reflective surface may be plated with a transflective film, so that part of light emitted from the display portion is reflected to the human eyes. The first reflective surface has a certain focal power to the light emitted from the display portion, so as to enlarge the viewing angle; while the ambient light passing through the transflective portion will not be deflected, that is, the transflective portion has no focal power to the ambient light; as a result, a scene in the ambient environment is normally observed by human eyes. Thus, in the embodiment of the present disclosure, the image displayed by light field can be superposed with the scene in the ambient environment, which allows to achieve an AR near-eye display device based on light field display.

At least one embodiment of the present disclosure further provides a near-eye display method, which includes: displaying a first image in a first time period and displaying a second image in a second time period, by using a display portion 11; converting light of the first image to first linearly polarized light, and converting light of the second image to second linearly polarized light, by using a polarization conversion portion 12, a polarization direction of the first linearly polarized light being different from a polarization direction of the second linearly polarized light; projecting the first linearly polarized light and the second linearly polarized light by using a projection portion 13; receiving the first linearly polarized light and the second linearly polarized light projected by the projection portion 13, causing the first linearly polarized light to be emitted towards a first direction and causing the second linearly polarized light to be emitted towards a second direction, by using a polarization splitting portion 14, the first direction being different from the second direction; and transmitting the first linearly polarized light in the first time period to form a first virtual image 31 located in a first image surface 21, and transmitting the second linearly polarized light in the second time period to form a second virtual image 32 located in a second image surface 22, by using an image light transmission portion 15, the first image surface 21 being different from the second image surface 22, an extension line of a connecting line of centers of the first virtual image 31 and the second virtual image 32 passing through the polarization splitting portion 14.

For example, the method further includes: providing a transflective portion to transmit ambient light.

For example, receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder. The third linearly polarized light is transmitted through the polarization splitting portion to form the first virtual image located in the first image surface.

For example, receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder. The fourth linearly polarized light is reflected by the polarization splitting portion to form the second virtual image located in the second image surface.

For example, the first linearly polarized light and the fourth linearly polarized light have a first polarization direction; the second linearly polarized light and the third linearly polarized light have a second polarization direction; the first polarization direction is perpendicular to the second polarization direction; a rotation direction of the first circularly polarized light is opposite to a rotation direction of the second circularly polarized light; and a rotation direction of the third circularly polarized light is opposite to a rotation direction of the fourth circularly polarized light. For example, the first direction is perpendicular to the second direction, without limited thereto. An angle formed by the first direction and the second direction is determined by an included angle between the transmitted light transmitted through the polarization splitting portion 14 and the reflected light reflected by the polarization splitting portion 14.

Figure 7:
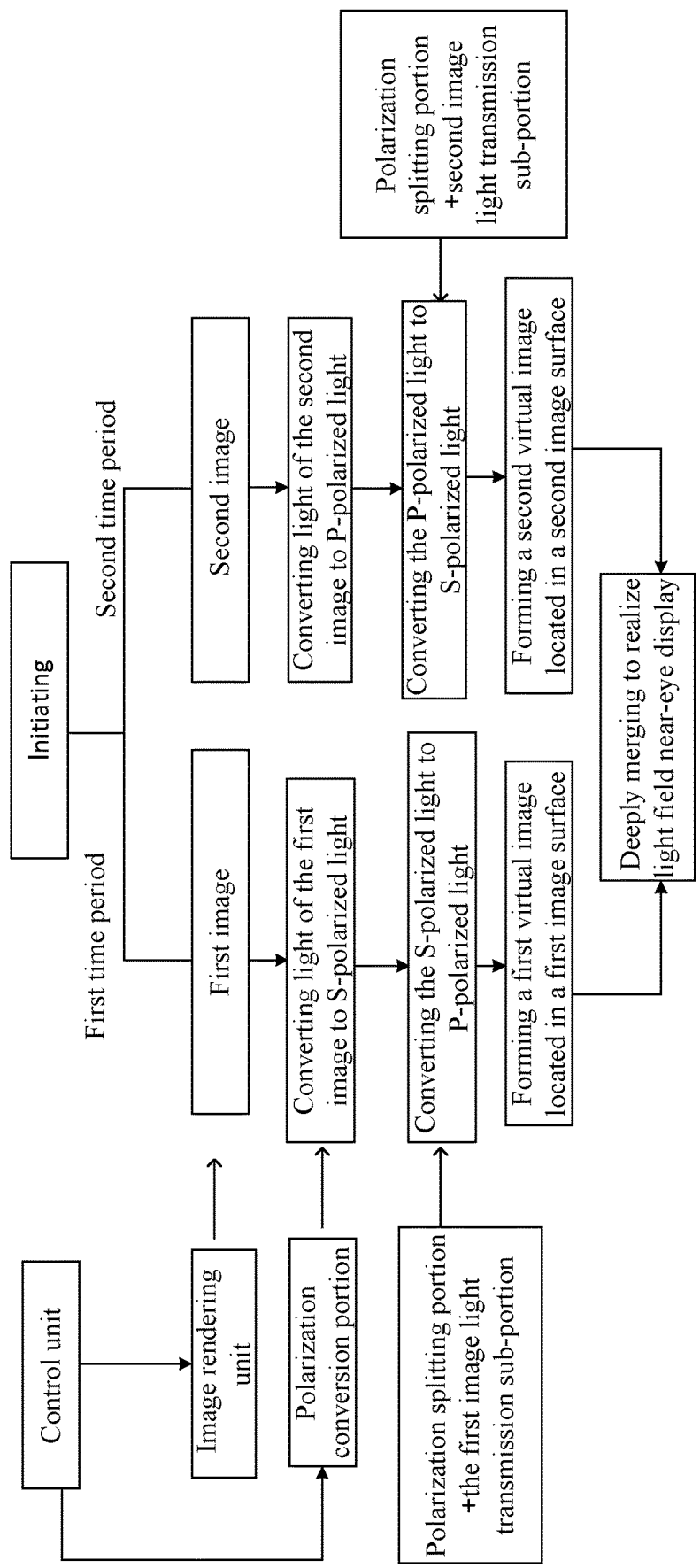
FIG. 7 is a working flow chart of a near-eye display device provided by an embodiment of the present disclosure.

FIG. 7 is a working flow chart of a near-eye display device provided by an embodiment of the present disclosure. As illustrated in FIG. 7, a first virtual image and a second virtual image are formed through different light paths in a first time period and a second period, respectively; the first virtual image and the second virtual image are deeply merged to realize light field display. Particular flows may also be referred to the related description of FIG. 2 and FIG. 3.

As illustrated in FIG. 7 in conjunction with FIG. 1, the working flow of the near-eye display device provided by an embodiment of the present disclosure is as follows.

(1) The control unit 16 controls the image rendering unit 17 to output required images to the display portion according to a time sequence; that is, displaying, by the display portion, a first image in a first time period, and to display a second image in a second time period.

(2) Converting light of the first image to S-polarized light in the first time period and converting light of the second image to P-polarized light in the second time period, by the polarization conversion portion 12.

(3) Converting, by the polarization splitting portion 14 and the first image light transmission sub-portion 151, the S-polarized light to P-polarized light in the first time period; and converting, by the polarization splitting portion 14 and the second image light transmission sub-portion 152, the P-polarized light to S-polarized light in the second time period; particular conversion of light path may be referred to FIG. 2 and FIG. 3, without repeatedly described herein.

(4) In the first time period, the P-polarized light being transmitted through the polarization splitting portion 14 to form the first virtual image 31 located in the first image surface 21; in the second time period, the S-polarized light being reflected by the polarization splitting portion 14 to form the second virtual image 32 located in the second image surface 22; the first image surface 21 being different from the second image surface 22.

(5) Deeply merging the first virtual image 31 and the second virtual image 32 to realize light field near-eye display.

Figure 8:
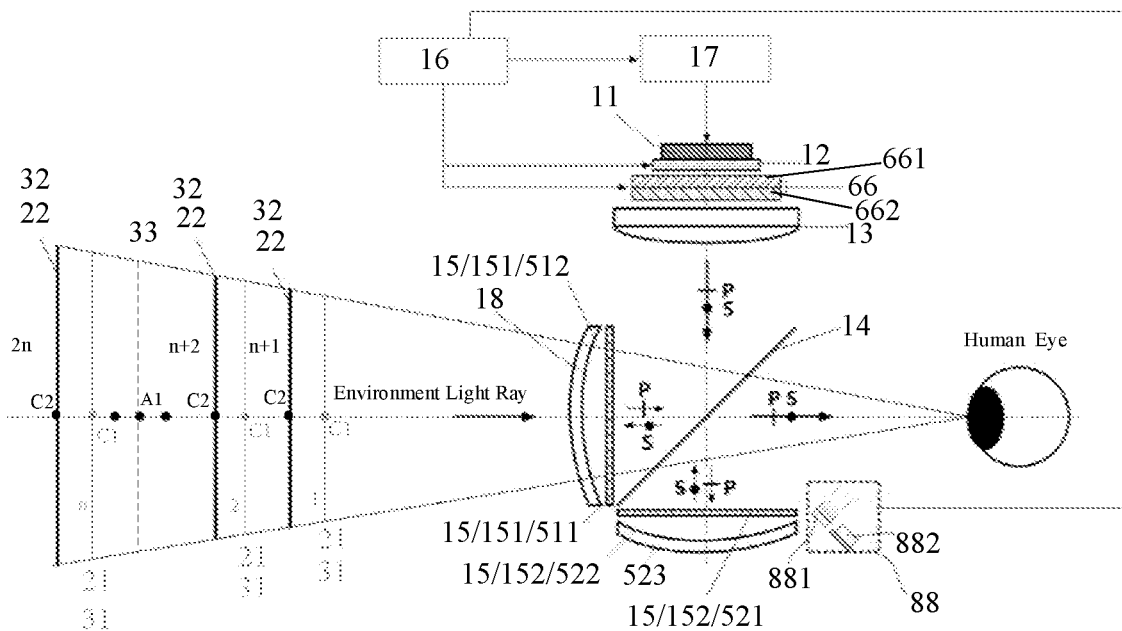
FIG. 8 is a schematic diagram of a near-eye display device (near-eye light field display device) provided by an embodiment of the present disclosure.
Figure 9:
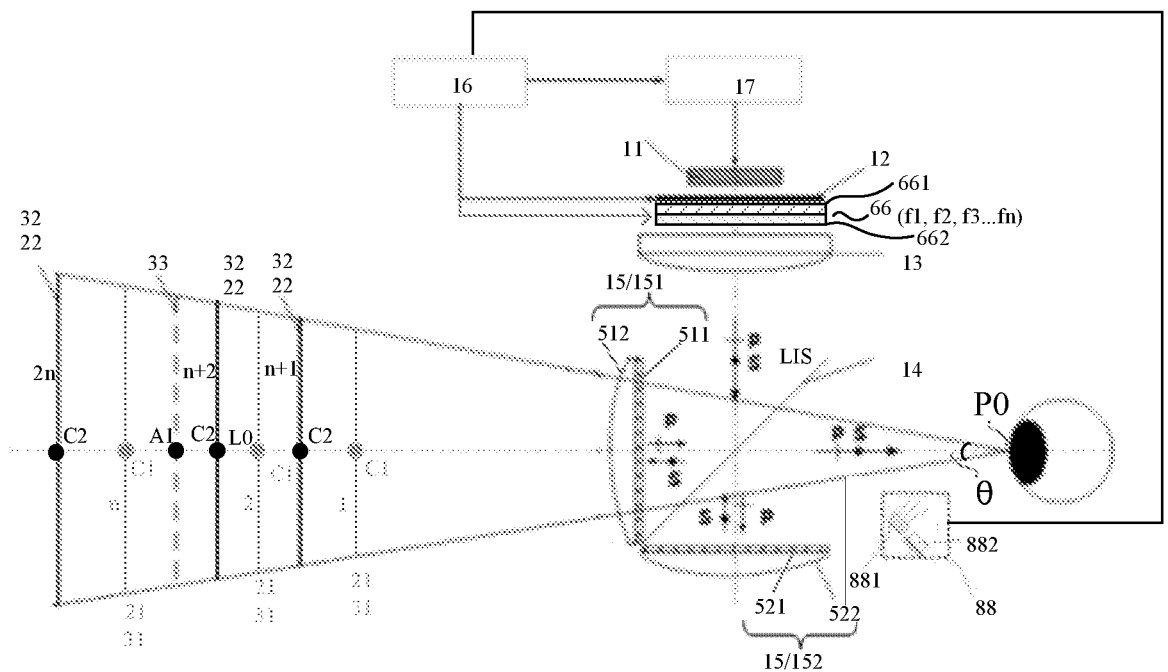
FIG. 9 is a schematic diagram of a near-eye display device (near-eye light field display device) provided by another embodiment of the present disclosure.
Figure 10:
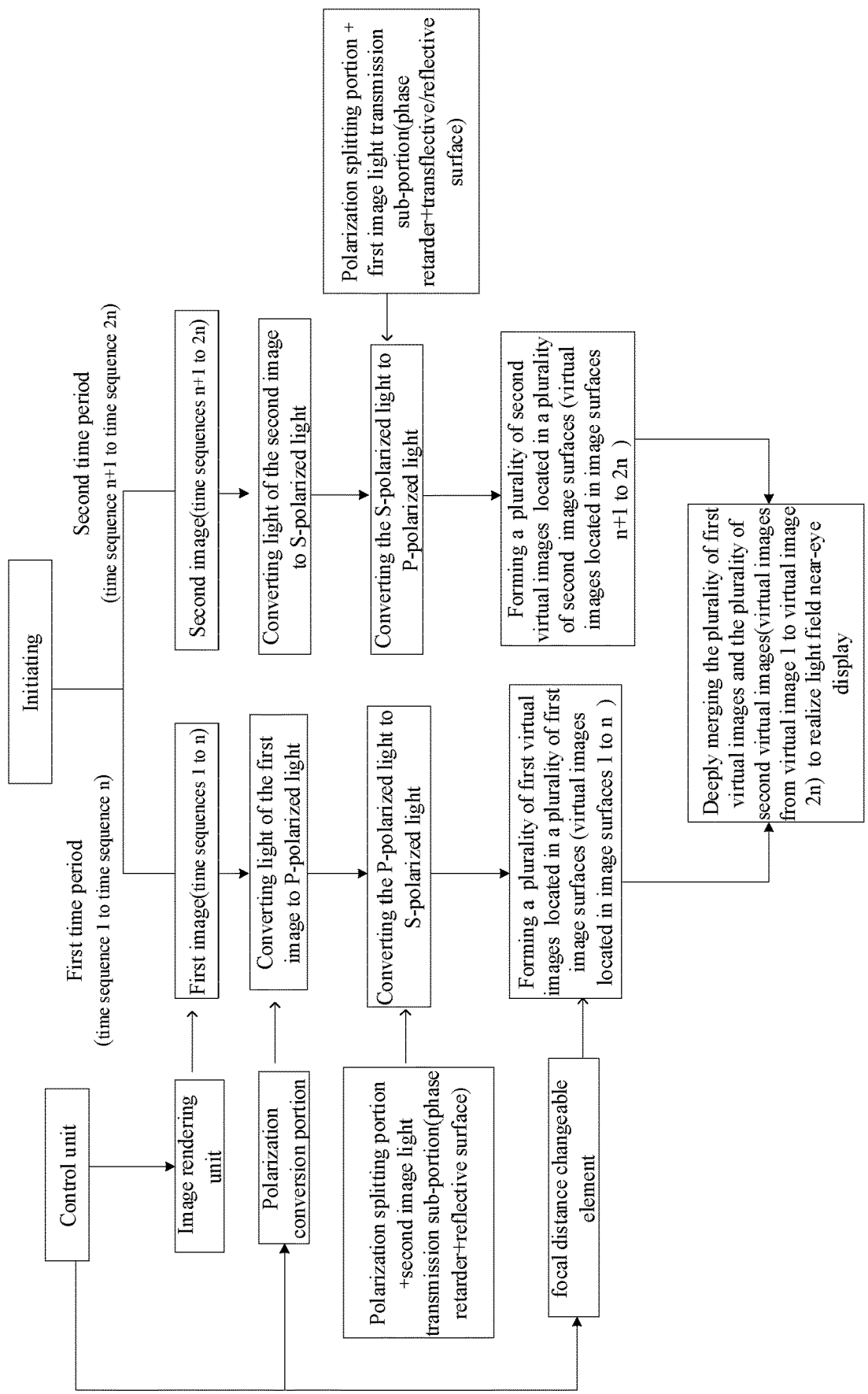
FIG. 10 is a working flow chart of a near-eye display device (near-eye light field display device) as illustrated in FIG. 8 or FIG. 9.

FIG. 8 is a schematic diagram of a near-eye display device (near-eye light field display device) provided by an embodiment of the present disclosure; FIG. 9 is a schematic diagram of a near-eye display device (near-eye light field display device) provided by another embodiment of the present disclosure; FIG. 10 is a working flow chart of a near-eye display device (near-eye light field display device) as illustrated in FIG. 8 or FIG. 9.

As illustrated in FIG. 8 and FIG. 9, the near-eye display device further includes a focal distance changeable element 66, the focal distance changeable element 66 is configured to perform a change in focal distance to form a plurality of focal distances, and the focal distance changeable element 66 is arranged between the polarization conversion portion 12 and the polarization splitting portion 14. As illustrated in FIG. 8 to FIG. 10, the focal distance changeable element 66 is configured to perform a change in focal distance in the first time period form a plurality of focal distances, and is configured to perform a change in focal distance in the second time period form a plurality of focal distances. As illustrated in FIG. 8 to FIG. 10, the focal distance changeable element 66 is configured to perform a change in focal distance in the first time period form a plurality of focal distances in different time sequences, and is configured to perform a change in focal distance in the second time period form a plurality of focal distances in different time sequences.

As illustrated in FIG. 8 to FIG. 10, in time sequence 1, the focal distance of the focal distance changeable element 66 is f1, and virtual image 1 is formed in image surface 1, in time sequence 2, the focal distance of the focal distance changeable element 66 is f2, and virtual image 2 is formed in image surface 2, and so on and so forth, in time sequence n, the focal distance of the focal distance changeable element 66 is fn, and virtual image n is formed in image surface n. As illustrated in FIG. 8 to FIG. 10, in time sequence n+1, the focal distance of the focal distance changeable element 66 can be f1, and virtual image n+1 is formed in image surface n+1, in time sequence n+2, the focal distance of the focal distance changeable element 66 can be f2, and virtual image n+2 is formed in image surface n+2, and so on and so forth, in time sequence 2n, the focal distance of the focal distance changeable element 66 can be fn, and virtual image 2n is formed in image surface 2n.

For example, the focal distance changeable element 66 is configured to change its focal distance. As illustrated in FIG. 8 and FIG. 9, a focal distance of the focal distance changeable element 66 is changeable, the focal distance of the focal distance changeable element 66 can be adjusted among first focal distance f1, second focal distance f2, . . . until $n^{th}$ focal distance fn. The focal distance of the focal distance changeable element 66 is adjusted so as to form a plurality of image surfaces. For example, in the same time period, under one focal distance, one virtual image located in one image surface can be formed. As illustrated in FIG. 8 to FIG. 10, the focal distance changeable element 66 can be configured to form a plurality of focal distances in the first time period to form a plurality of first virtual images 31 located in a plurality of first image surfaces 21. As illustrated in FIG. 8 to FIG. 10, the focal distance changeable element 66 can be configured to form a plurality of focal distances in the second time period to form a plurality of second virtual images 32 located in a plurality of second image surfaces 22.

As illustrated in FIG. 8 and FIG. 9, the polarization conversion portion 12 is located between the display portion 11 and the focal distance changeable element 66.

As illustrated in FIG. 8 and FIG. 9, the focal distance changeable element 66 is located between the polarization conversion portion 12 and the projection portion 13.

As illustrated in FIG. 8 and FIG. 9, the near-eye display device further includes a sightline tracking unit 88 configured to provide information of three-dimensional position of a viewing point of human eyes to form a plurality of virtual images including virtual images in front of and behind a plane in which the viewing point is located. Of course, the plurality of virtual images may also include a virtual image located on the plane in which the viewing point is located.

As illustrated in FIG. 8 and FIG. 9, the sightline tracking unit 88 includes an infrared emitter 881 and an infrared camera 882. The infrared emitter 881 is configured to emit infrared rays to human eyes. The infrared camera 882 is configured to capture the iris (eyeball) positions of the human eyes, so as to determine the three-dimensional position of the viewing point.

As illustrated in FIG. 8 and FIG. 9, the focal distance changeable element 66 is connected to the control unit 16, the control unit 16 is configured to adjust the focal distance of the focal distance changeable element 66 according to the information of three-dimensional position of the viewing point, so as to allow the focal distance to change in a predetermined range, so that a plurality of virtual images located on or near the plane in which the viewing point is located are formed.

As illustrated in FIG. 8 and FIG. 9, the sightline tracking unit 88 is connected to the control unit 16. For example, the control unit 16 is configured to provide the information of three-dimensional position of the viewing point according to the picture transmitted by the sightline tracking unit 88.

As illustrated in FIG. 8 and FIG. 9, the control unit 16 is configured to adjust the focal distance to be a plurality of focal distances in the first time period and in the second time period, respectively, so as to form a plurality of first virtual images 31 in the first time period and form a plurality of second virtual images 32 in the second time period. The plurality of first virtual images 31 include virtual images located in front of and behind the plane in which the viewing point is located, and the plurality of second virtual images 32 include virtual images located in front of and behind the plane in which the viewing point is located. For example, the first virtual images 31 and the second virtual images 32 are merged to form a perceived image 33 located in a position on or near the plane in which the viewing point is located.

For example, the focal distance changeable element 66 is configured to perform a change in focal distance according to the information of three-dimensional position of the viewing point. For example, the focal distance changeable element 66 is configured to perform a change in focal distance to form a plurality of focal distances according to the information of three-dimensional position of the viewing point.

As illustrated in FIG. 8 and FIG. 9, the focal distance changeable element 66 is configured to form a plurality of focal distances in the first time period so that the image light transmission portion 15 is configured to transmit the first linearly polarized light in the first time period and form a plurality of first virtual images 31 located in a plurality of first image surfaces 21, and the focal distance changeable element 66 is configured to form a plurality of focal distances in the second time period so that the image light transmission portion 15 is configured to transmit the second linearly polarized light in the second time period and form a plurality of second virtual images 32 located in a plurality of second image surfaces 22.

As illustrated in FIG. 8 and FIG. 9, an extension line of, a connecting line L0 of centers C1 of the plurality of first virtual images 31 and centers C2 of the plurality of second virtual images 32, passes through the polarization splitting portion 14.

As illustrated in FIG. 8 and FIG. 9, positions of the plurality of first image surfaces 21 and positions of the plurality of second image surfaces 22 can be different. For example, the plurality of first image surfaces 21 include image surfaces in front of and behind the viewing point, and the plurality of second image surfaces 22 include image surfaces in front of and behind the viewing point.

FIG. 8 and FIG. 9 illustrate the viewing point A1, and illustrate a plurality of image surfaces including image surface 1, image surface 2, . . . until image surface n, FIG. 9 also illustrate image surface (n+1), image surface (n+2), until image surface 2n. The numbers referring to image surfaces in FIG. 8 and FIG. 9 may also refer to virtual images. It should be noted that the embodiment of the present disclosure does not limit the number of image surfaces located in front of the viewing point A1 and the number of image surfaces located behind the viewing point A1. Generally speaking, the number of image surfaces located in front of the viewing point A1 is greater than 1, and the number of image surfaces located behind the viewing point A1 is greater than 1. That is, the number of the first virtual images 31 located in front of the viewing point A1 is greater than 1, the number of the first virtual images 31 located behind the viewing point A1 is greater than 1, the number of the second virtual images 32 located in front of the viewing point A1 is greater than 1, and the number of the second virtual images 32 located behind the viewing point A1 is greater than 1.

For example, a position located in front of the viewing point A1 refers to a side of the viewing point A1 close to human eyes, a position located behind the viewing point A1 refers to a side of the viewing point A1 away from human eyes. Specifically, as illustrated in FIG. 8 and FIG. 9, a position located in front of the viewing point A1 refers to a right side of the viewing point A1, and a position located behind the viewing point A1 refers to a left side of the viewing point A1.

As illustrated in FIG. 8 and FIG. 9, the purpose of providing the near-eye light field display device is to increase the number of spatial image surfaces/virtual images and improve the 3D display effect of light field. The control unit 16 (system control unit) controls the image rendering unit 17 to render corresponding display images in time sequence, by using the focal distance changeable element 66, by time division multiplexing, according to the information of three-dimensional position of the viewing point of the human eyes provided by the sightline tracking unit 88. The display portion 11 may adopt a display element with a high refresh rate. The polarization conversion portion 12 is located between the display portion 11 and the focal distance changeable element 66, polarization state of the light rays emitted from the display portion 11 can be converted into S linearly polarized state or P linearly polarized state to obtain S-polarized light or P-polarized light, respectively. In the case where the light rays emitted from the display portion 11 are converted into P-polarized light, in n time sequences from time sequence 1 to time sequence n, the focal distance of the focal distance changeable element 66 is adjusted, P-polarized light is transmitted through the polarization splitting portion 14, and then passes through the second phase retarder 521 (quarter-wave plate) to become circularly polarized light, and is reflected by the reflective surface (second reflective surface 522) of the reflective element 523, and then passes through the second phase retarder 521 (quarter-wave plate) again. At this time, the polarization state becomes S linearly polarization state (S-polarized light), S-polarized light enters the human eye after being reflected by the polarization splitting portion 14 to form a plurality of first virtual images 31 located in first image surfaces from image surface 1, to image surface 2, until image surface n. In the case where the light rays emitted from the display portion 11 are converted into S-polarized light (S-polarized state), in n time sequences from time sequence n+1 to time sequence 2n, the focal distance of the focal distance changeable element 66 is adjusted, S-polarized light is reflected by the polarization splitting portion 14, and then passes through the first phase retarder 511 (quarter-wave plate) to become circularly polarized light, and is reflected by the transflective surface (reflective surface, first reflective surface 512) of the transflective portion 18, and then passes through the first phase retarder 511 (quarter-wave plate) again. At this time, the polarization state becomes P linearly polarization state (P-polarized light), P-polarized light enters the human eye after being transmitted through the polarization splitting portion 14 to form a plurality of second virtual images 32 located in second image surfaces 22 from image surface n+1, to image surface n+2, and until image surface 2n. Because the focal power of the reflective surface (the second reflective surface 522) of the reflective element is different from that of the transflective surface of the transflective element 18 (the first reflective surface 512), or because the curvature radius of the reflective surface (the second reflective surface 522) of the reflective element is different from that of the transflective surface of the transflective element 18 (the first reflective surface 512), the image surface formed after entering the human eye through the near-eye display device does not coincide with the image surface 1 to image surface n, and the image surfaces from image surface n+1 to image surface 2n are formed. In 2n time sequences in a display period, 2n image surfaces can be formed, where n is equal to or less than the maximum number of focal distances formed by focal distance changeable element 66. A display period (display cycle) consisting of 2n time sequences needs to be shorter than the refresh time of human eyes which is generally 1/30 second. According to the result of sightline tracking, the position of the viewing point of human eyes is obtained. Through image rendering of virtual images on different image surfaces, the plurality of first virtual images 31 and the plurality of second virtual images 32 are deeply merged to form a perceived image on or near the plane in which the viewing point is located. The position of the deeply merged perceived plane can change with the position change of the viewing point of human eyes, thereby forming a natural 3D display of light field, and alleviating the visual fatigue of human eyes.

FIG. 10 is a working flow chart of a near-eye display device (near-eye light field display device) as illustrated in FIG. 8 or FIG. 9. At the beginning of a display period (display cycle, the display period is shorter than the refresh time of human eyes which is generally 1/30 second), firstly, in time sequences from time sequence 1 to time sequence n (in the first time period), for example, according to the information of three-dimensional position of the viewing point of the human eyes provided by the sightline tracking unit 88, the control unit 16 (system control unit) controls the image rendering unit 17 to render corresponding display images in time sequence i (i=1, 2, . . . , n), the control unit 16 (system control unit) controls the polarization conversion portion 12 to convert light rays emitted from the display portion 11 into P-polarized light, the P-polarized light is transmitted through the polarization splitting portion 14, and then passes through the second phase retarder 521 (quarter-wave plate), and is reflected by the reflective surface (second reflective surface 522) of the reflective element 523, and then passes through the second phase retarder 521 (quarter-wave plate) again. At this time, the polarization state becomes S polarization state (S-polarized light), S-polarized light enters the human eye after being reflected by the polarization splitting portion 14 to form a plurality of first virtual images 31 located in first image surfaces from image surface 1 to image surface n. In time sequences from time sequence n+1 to time sequence 2n (in the second time period), for example, according to the information of three-dimensional position of the viewing point of the human eyes provided by the sightline tracking unit 88, the control unit 16 (system control unit) controls the image rendering unit 17 to render corresponding display images in time sequences i (i=n+1, n+2, . . . , 2n), the control unit 16 (system control unit) controls the polarization conversion portion 12 to convert light rays emitted from the display portion 11 into S-polarized light, the S-polarized light is reflected by the polarization splitting portion 14, and then passes through the first phase retarder 511 (quarter-wave plate), and then is reflected by the transflective surface of the transflective portion 18 (reflective surface, first reflective surface 512), and then passes through the first phase retarder 511 (quarter-wave plate) again. At this time, the polarization state becomes P polarization state (P-polarized light), P-polarized light enters the human eye after being transmitted through the polarization splitting portion 14 to form a plurality of second virtual images 32 located in second image surfaces 22 from image surface n+1 to image surface 2n (virtual images from virtual image n+1 to virtual image 2n located in image surfaces form virtual image n+1 to virtual image 2n, respectively). Virtual images from virtual image 1 to virtual image 2n located in image surfaces from image surface 1 to image surface 2n (the plurality of first virtual images 31 and the plurality of second virtual images 32) are deeply merged to form a natural 3D display of light field in human eyes.

By using the focal distance changeable element 66, the near-eye display device as illustrated in FIG. 8 and FIG. 9 can increase the number of spatial virtual images and the number of spatial image surfaces to realize a more realistic 3D display merged effect of light field. For example, the position of the viewing point of human eyes can be obtained according to the result of sightline tracking, virtual images from virtual image 1 to virtual image 2n (the plurality of first virtual images 31 and the plurality of second virtual images 32) are deeply merged to form a perceived image 33 on or near the plane in which the viewing point is located, the deeply merged perceived plane can change with the position change of the viewing point of human eyes, a natural light field 3D display is formed, the visual fatigue of human eyes can be alleviated.

The near-eye display device provided by the embodiment of the present disclosure, by using the polarization conversion portion 12 and the focal distance changeable element 66, and combining with polarization splitting portion 14, light efficiency can be improved, and merged light field 3D display of a plurality of spatial virtual images can be realized, the display resolution is high, moreover, the convergence-adjusting conflict of human eye in ordinary AR is solved, and the 3D display of natural light field is realized.

Because the focal distance changeable element 66 can adjust focal distance for the optical system, the real-time adjustment of the image surface is performed according to the information of viewing point provided by the sightline tracking unit 88, the image surface can be adjusted to or near the plane where the viewing point is located, and the image rendering unit 17 is controlled by the control unit 16 (system control unit) to render the required display image, so as to obtain an image display that conforms to the monocular focal distance adjustment of human eyes. That is, the augmented reality near-eye display device (display system) provided by the embodiment of the present disclosure can realize the monocular focusing function of human eyes, and the displayed virtual objects can have focusing and blurring effects with the change of viewing point of human eyes, so that the observed images (perceived image) conform to visual characteristics of human eyes and realize light field display, thereby alleviating visual fatigue of human eyes.

Based on the near-eye display device as illustrated in FIG. 6, a focal distance changeable element 66 and a sightline tracking unit 88 are added so as to obtain the near-eye display device as illustrated in FIG. 8. Based on the near-eye display device as illustrated in FIG. 1, a focal distance changeable element 66 and a sightline tracking unit 88 are added so as to obtain the near-eye display device as illustrated in FIG. 9.

Of course, in other embodiments, the sightline tracking unit 88 may not be added, and only the focal distance changeable element 66 can be added. In this case, the virtual images from virtual image 1 to virtual image 2n (the plurality of first virtual images 31 and the plurality of second virtual images 32) are deeply merged to form a perceived image 33 located in a plane. Because the plurality of first virtual images 31 are formed in the first time period and the plurality of second virtual images 32 are formed in the second time period, it is conducive to realizing merged light field 3D display of multiple spatial virtual images.

For example, the focal distance changeable element 66 includes a liquid crystal focal distance changeable element. Of course, the focal distance changeable element 66 can also take other forms such as a liquid lens, and is not limited to a liquid crystal focal distance changeable element.

Figure 11:
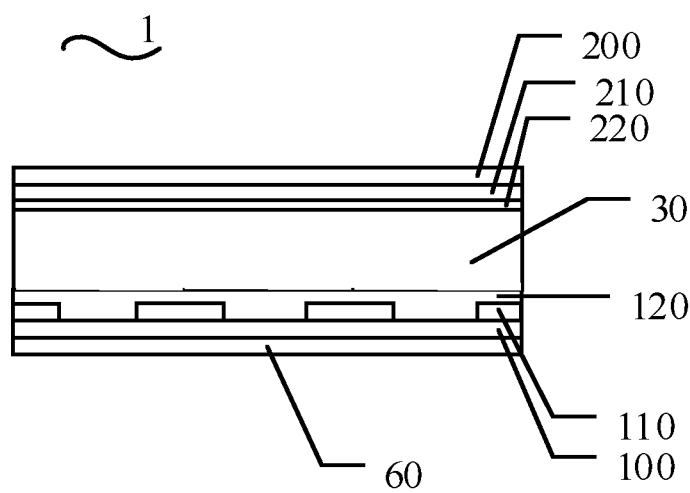
FIG. 11 is a schematic diagram of a liquid crystal focal distance changeable element.

FIG. 11 illustrates a schematic diagram of a liquid crystal focal distance changeable element. As illustrated in FIG. 11, the focal distance changeable element 66 includes a first substrate 100, a second substrate 200, and a liquid crystal layer 30 disposed between the first substrate 100 and the second substrate 200. The liquid crystal focal distance changeable element 1 further includes a first electrode 110 and a second electrode 210 that are configured to form an electric field to drive liquid crystal molecules in the liquid crystal layer 30 to rotate. Upon an electric field being formed between the first electrode 110 and the second electrode 210 (a driving signal is applied), the refractive index of the liquid crystal layer 30 changes, so that the focal distance of the focal distance changeable element can be adjusted. FIG. 11 also illustrates a planarization layer 120 and a planarization layer 220. As illustrated in FIG. 11, a plurality of first electrodes 110 are separated from each other, and are independent from each other.

FIG. 11 also illustrates a polarizer 60. The polarizer 60 can transmit S-polarized light or P-polarized light. For example, a side of the focal distance changeable element where the polarizer 60 is provided can be the light incoming surface of the focal distance changeable element. Of course, in some embodiments, the polarizer 60 may not be provided in the focal distance changeable element. It should be noted that the structure of the focal distance changeable element is not limited to that illustrated in FIG. 11, and can adopt other suitable structures.

For example, the focal distance changeable element 66 includes a liquid crystal focal distance changeable element 661 and a liquid crystal focal distance changeable element 662. One of S-polarized light and P-polarized light can pass through the liquid crystal focal distance changeable element 661, and the other of S-polarized light and P-polarized light can pass through the liquid crystal focal distance changeable element 662.

For example, the liquid crystal layers in the liquid crystal focal distance changeable element 661 and the liquid crystal focal distance changeable element 662 may be different.

For example, the polarizer in the liquid crystal focal distance changeable element 661 and the polarizer in the liquid crystal focal distance changeable element 662 can transmit light with different polarization states, respectively.

For example, in the embodiment of the present disclosure, in the first time period, the light L1 of the first image, the first linearly polarized light (S-polarized light), the first circularly polarized light CL1, the second circularly polarized light CL2 and the third linearly polarized light (P-polarized light) are the same light beam at different positions of the same propagation path.

For example, in the embodiment of the present disclosure, in the second time period, the light L2 of the second image, the second linearly polarized light (P-polarized light), the third circularly polarized light CL3, the fourth circularly polarized light CL4 and the fourth linearly polarized light (S-polarized light) are the same light beam at different positions of the same propagation path.

In the embodiment of the present disclosure, the near-eye display device as illustrated in FIG. 1 to FIG. 3 and FIG. 6 to FIG. 7 is described with reference to the case where the light of the first image is converted to S-polarized light in the first time period and the light of the second image is converted to P-polarized light in the second time period, by way of example, without limited thereto. It's also possible that, the light of the first image is converted to P-polarized light in the first time period and the light of the second image is converted to S-polarized light in the second time period; correspondingly, the polarization splitting portion 14 transmits P-polarized light in the first time period and reflects S-polarized light in the second time period; after subsequent light path modulation, virtual images located in different image surfaces are further formed.

In the embodiment of the present disclosure, the near-eye display device as illustrated in FIG. 8 to FIG. 10 is described with reference to the case where the light of the first image is converted to P-polarized light in the first time period and the light of the second image is converted to S-polarized light in the second time period, by way of example, without limited thereto. It's also possible that, the light of the first image is converted to S-polarized light in the first time period and the light of the second image is converted to P-polarized light in the second time period; correspondingly, the polarization splitting portion 14 reflects S-polarized light in the first time period and transmits P-polarized light in the second time period; after subsequent light path modulation, virtual images located in different image surfaces are further formed.

The embodiment of the present disclosure is described with reference to the case where the polarization splitting portion 14 transmits P-polarized light and reflects S-polarized light, by way of example. In some other embodiments, the polarization splitting portion 14 may also reflect P-polarized light and transmit S-polarized light. Correspondingly, the P-polarized light reflected by the polarization splitting portion 14 is converted to S-polarized light upon processed by the first image light transmission sub-portion 151 and forms the first virtual image; the S-polarized light transmitted by the polarization splitting portion 14 is converted to P-polarized light upon processed by the second image light transmission sub-portion 152 and forms the second virtual image.

The near-eye display device provided by the embodiment of the present disclosure may further include one or more processors and one or more memories. The processor can process data signal, and may include various computing structures, for example, Complex Instruction Set Computer (CISC) structure, Reduced Instruction Set Computer (RISC) structure or a structure implementing combinations of various instruction sets. The memory can store instruction(s) and/or data executed by the processor(s). These instruction (s) and/or data may include code, and may be used for realizing some or all of the functions of one or more elements described in the embodiments of the present disclosure. For example, the memory includes Dynamic Random Access Memory (DRAM), Static Random Access Memory (SRAM), flash memory, optical memory or other memories well-known to those skilled in the art.

In some embodiments of the present disclosure, the control unit 16 and the image rendering unit 17 include code(s) and program(s) stored in the memory; the processor can execute the code(s) and program(s) to realize some or all of the functions of the above-described control unit 16 and image rendering unit 17.

In some embodiments of the present disclosure, the control unit 16 and the image rendering unit 17 may be special hardware devices for realizing some or all of the functions of the above-described control unit 16 and image rendering unit 17. For example, the control unit 16 and the image rendering unit 17 may be one circuit board or a combination of multiple circuit boards for realizing the above-described functions. In the embodiment of the present disclosure, the one circuit board or the combination of multiple circuit boards may include: (1) one or more processor; (2) one or more non-transient computer-readable memory connected to the processor(s); and (3) a firmware executable by the processor and stored in the memory.

In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed by the present disclosure, which should be encompassed in protection scopes of the present disclosure. Therefore, the scopes of the present disclosure should be defined in the appended claims.

What is claimed is:

1. A near-eye display device, comprising:
a display portion, configured to display a first image in a first time period and display a second image in a second time period;
a polarization conversion portion, configured to convert light of the first image to first linearly polarized light, and convert light of the second image to second linearly polarized light, a polarization direction of the first linearly polarized light being different from a polarization direction of the second linearly polarized light;
a polarization splitting portion, configured to receive the first linearly polarized light and the second linearly polarized light, cause the first linearly polarized light to be emitted towards a first direction and cause the second linearly polarized light to be emitted towards a second direction, the first direction being different from the second direction; and
an image light transmission portion, configured to transmit the first linearly polarized light in the first time period, and configured to transmit the second linearly polarized light in the second time period,
wherein the near-eye display device further comprises: a focal distance changeable element, wherein the focal distance changeable element is configured to perform a change in focal distance to form a plurality of focal distances, and the focal distance changeable element is arranged between the polarization conversion portion and the polarization splitting portion,
wherein the focal distance changeable element is configured to form a plurality of focal distances in the first time period so that the image light transmission portion is configured to transmit the first linearly polarized light in the first time period and form a plurality of first virtual images located in a plurality of first image surfaces, and the focal distance changeable element is configured to form a plurality of focal distances in the second time period so that the image light transmission portion is configured to transmit the second linearly polarized light in the second time period and form a plurality of second virtual images located in a plurality of second image surfaces,
wherein the plurality of first virtual images comprise a virtual image located in front of the plane in which the viewing point is located and a virtual image located behind the plane in which the viewing point is located, and the plurality of second virtual images comprise a virtual image located in front of the plane in which the viewing point is located and a virtual image located behind the plane in which the viewing point is located.

2. The near-eye display device according to claim 1, further comprising a projection portion, wherein
the projection portion is located between the focal distance changeable element and the polarization splitting portion; the projection portion is configured to project the first linearly polarized light and the second linearly polarized light; and
the polarization splitting portion is configured to receive the first linearly polarized light and the second linearly polarized light as projected by the projection portion.

3. The near-eye display device according to claim 1, wherein an extension line of a connecting line of centers of the plurality of first virtual images and the second plurality of virtual images passes through the polarization splitting portion.

4. A near-eye display device, comprising:
a display portion, configured to display a first image in a first time period and display a second image in a second time period;
a polarization conversion portion, configured to convert light of the first image to first linearly polarized light, and convert light of the second image to second linearly polarized light, a polarization direction of the first linearly polarized light being different from a polarization direction of the second linearly polarized light;
a polarization splitting portion, configured to receive the first linearly polarized light and the second linearly polarized light, cause the first linearly polarized light to be emitted towards a first direction and cause the second linearly polarized light to be emitted towards a second direction, the first direction being different from the second direction; and
an image light transmission portion, configured to transmit the first linearly polarized light in the first time period, and configured to transmit the second linearly polarized light in the second time period,
wherein the near-eye display device further comprises: a focal distance changeable element, wherein the focal distance changeable element is configured to perform a change in focal distance to form a plurality of focal distances, and the focal distance changeable element is arranged between the polarization conversion portion and the polarization splitting portion,
wherein the focal distance changeable element is configured to form a plurality of focal distances in the first time period so that the image light transmission portion is configured to transmit the first linearly polarized light in the first time period and form a plurality of first virtual images located in a plurality of first image surfaces, and the focal distance changeable element is configured to form a plurality of focal distances in the second time period so that the image light transmission portion is configured to transmit the second linearly polarized light in the second time period and form a plurality of second virtual images located in a plurality of second image surfaces,
wherein the near-eye display device further comprises: a sightline tracking unit, wherein the sightline tracking unit is configured to provide information of three-dimensional position of a viewing point of human eyes, and the focal distance changeable element is configured to perform the change in focal distance according to the information of three-dimensional position of the viewing point so that the plurality of first virtual images and the plurality of second virtual images are merged to form a perceived image on or near a plane in which the viewing point is located,
wherein the plurality of first virtual images comprise a virtual image located in front of the plane in which the viewing point is located and a virtual image located behind the plane in which the viewing point is located, and the plurality of second virtual images comprise a virtual image located in front of the plane in which the viewing point is located and a virtual image located behind the plane in which the viewing point is located.

5. The near-eye display device according to claim 4, wherein the polarization splitting portion comprises a light incoming surface configured to receive the first linearly polarized light and the second linearly polarized light;
the image light transmission portion comprises a first image light transmission sub-portion and a second image light transmission sub-portion, the first image light transmission sub-portion and the second image light transmission sub-portion are disposed at two sides of the polarization splitting portion, respectively;
the first image light transmission sub-portion is located at a side of the polarization splitting portion where the light incoming surface is located, and the second image light transmission sub-portion is located at a side of the polarization splitting portion opposite to the light incoming surface; and
the extension line of the connecting line of centers of the plurality of first virtual images and the plurality of second virtual images passes through the first image light transmission sub-portion.

6. The near-eye display device according to claim 5, wherein
the first image light transmission sub-portion comprises a first phase retarder and a first reflective surface, the first phase retarder is closer to the polarization splitting portion than the first reflective surface to the polarization splitting portion; the first phase retarder is configured to receive the first linearly polarized light emitted towards the first direction and convert the first linearly polarized light to first circularly polarized light; the first reflective surface is configured to reflect the first circularly polarized light and convert the first circularly polarized light to second circularly polarized light; the first phase retarder is further configured to receive the second circularly polarized light and convert the second circularly polarized light to third linearly polarized light; the third linearly polarized light is transmitted through the polarization splitting portion to form the plurality of first virtual images located in the plurality of first image surfaces;
the second image light transmission sub-portion comprises a second reflective surface and a second phase retarder, the second phase retarder is closer to the polarization splitting portion than the second reflective surface to the polarization splitting portion; the second phase retarder is configured to receive the second linearly polarized light emitted towards the second direction and convert the second linearly polarized light to third circularly polarized light; the second reflective surface is configured to reflect the third circularly polarized light and convert the third circularly polarized light to fourth circularly polarized light; the second phase retarder is further configured to receive the fourth circularly polarized light and convert the fourth circularly polarized light to fourth linearly polarized light; the fourth linearly polarized light is reflected by the polarization splitting portion to form the plurality of second virtual images located in the plurality of second image surfaces.

7. The near-eye display device according to claim 6, wherein a focal power of the first reflective surface is different from a focal power of the second reflective surface.

8. The near-eye display device according to claim 6, further comprising a transflective portion, wherein
the transflective portion is configured to transmit ambient light,
the transflective portion comprises a first transflective sub-portion and a second transflective sub-portion, the first reflective surface is located between the first transflective sub-portion and the second transflective sub-portion,
a refractivity of the first transflective sub-portion is as same as a refractivity of the second transflective sub-portion.

9. The near-eye display device according to claim 4, further comprising a control unit, wherein the control unit is configured to adjust a focal distance of the focal distance changeable element according to the information of three-dimensional position of the viewing point of human eyes.

10. A near-eye display method, comprising:
displaying a first image in a first time period and displaying a second image in a second time period, by using a display portion;
converting light of the first image to first linearly polarized light, and converting light of the second image to second linearly polarized light, by using a polarization conversion portion, a polarization direction of the first linearly polarized light being different from a polarization direction of the second linearly polarized light;
receiving the first linearly polarized light and the second linearly polarized light, causing the first linearly polarized light to be emitted towards a first direction and causing the second linearly polarized light to be emitted towards a second direction, by using a polarization splitting portion, the first direction being different from the second direction; and
transmitting the first linearly polarized light in the first time period and transmitting the second linearly polarized light in the second time period, by using an image light transmission portion,
wherein the near-eye display method further comprises:
performing a change in focal distance to form a plurality of focal distances, by using a focal distance changeable element,
wherein the near-eye display method further comprises:
performing the change in focal distance in the first time period to form the plurality of focal distances, and transmitting the first linearly polarized light in the first time period to form a plurality of first virtual images located in a plurality of first image surfaces, and
performing the change in focal distance in the second time period to form the plurality of focal distances, and transmitting the second linearly polarized light in the second time period to form a plurality of second virtual images located in a plurality of second image surfaces, by using the image light transmission portion,
wherein the near-eye display method further comprises:
providing, by using a sightline tracking unit, information of three-dimensional position of a viewing point of human eyes, and
performing the change in focal distance, by using the focal distance changeable element, according to information of three-dimensional position of the viewing point,
wherein the plurality of first virtual images comprise a virtual image located in front of a plane in which the viewing point is located and a virtual image located behind the plane in which the viewing point is located, and the plurality of second virtual images comprise a virtual image located in front of the plane in which the viewing point is located and a virtual image located behind the plane in which the viewing point is located.

11. The near-eye display method according to claim 10, wherein the plurality of first virtual images and the plurality of second virtual images are merged to form a perceived image on or near a plane in which the viewing point is located.

12. The method according to claim 10, wherein
receiving the first linearly polarized light emitted towards the first direction and converting the first linearly polarized light to first circularly polarized light, by using a first phase retarder; reflecting the first circularly polarized light and converting the first circularly polarized light to second circularly polarized light, by using a first reflective surface; receiving the second circularly polarized light and converting the second circularly polarized light to third linearly polarized light, by using the first phase retarder, wherein the third linearly polarized light is transmitted through the polarization splitting portion to form a plurality of first virtual images located in the plurality of first image surfaces;
receiving the second linearly polarized light emitted towards the second direction and converting the second linearly polarized light to third circularly polarized light, by using a second phase retarder; reflecting the third circularly polarized light and converting the third circularly polarized light to fourth circularly polarized light, by using a second reflective surface; receiving the fourth circularly polarized light and converting the fourth circularly polarized light to fourth linearly polarized light, by using the second phase retarder, wherein the fourth linearly polarized light is reflected by the polarization splitting portion to form a plurality of second virtual images located in the plurality of second image surfaces;
the first linearly polarized light and the fourth linearly polarized light have a first polarization direction; the second linearly polarized light and the third linearly polarized light have a second polarization direction; the first polarization direction is perpendicular to the second polarization direction,
a rotation direction of the first circularly polarized light is opposite to a rotation direction of the second circularly polarized light; and a rotation direction of the third circularly polarized light is opposite to a rotation direction of the fourth circularly polarized light.

13. The near-eye display device according to claim 4, wherein an extension line of a connecting line of centers of the plurality of first virtual images and the second plurality of virtual images passes through the polarization splitting portion.

14. The near-eye display device according to claim 4, further comprising a projection portion, wherein
the projection portion is located between the focal distance changeable element and the polarization splitting portion; the projection portion is configured to project the first linearly polarized light and the second linearly polarized light; and
the polarization splitting portion is configured to receive the first linearly polarized light and the second linearly polarized light as projected by the projection portion.

15. The near-eye display method according to claim 10, wherein an extension line of a connecting line of centers of the plurality of first virtual images and the plurality of second virtual images passes through the polarization splitting portion.

16. The near-eye display device according to claim 1, wherein the polarization splitting portion comprises a light incoming surface configured to receive the first linearly polarized light and the second linearly polarized light;
the image light transmission portion comprises a first image light transmission sub-portion and a second image light transmission sub-portion, the first image light transmission sub-portion and the second image light transmission sub-portion are disposed at two sides of the polarization splitting portion, respectively;
the first image light transmission sub-portion is located at a side of the polarization splitting portion where the light incoming surface is located, and the second image light transmission sub-portion is located at a side of the polarization splitting portion opposite to the light incoming surface; and
the extension line of the connecting line of centers of the plurality of first virtual images and the plurality of second virtual images passes through the first image light transmission sub-portion.

17. The near-eye display device according to claim 16, wherein
the first image light transmission sub-portion comprises a first phase retarder and a first reflective surface, the first phase retarder is closer to the polarization splitting portion than the first reflective surface to the polarization splitting portion; the first phase retarder is configured to receive the first linearly polarized light emitted towards the first direction and convert the first linearly polarized light to first circularly polarized light; the first reflective surface is configured to reflect the first circularly polarized light and convert the first circularly polarized light to second circularly polarized light; the first phase retarder is further configured to receive the second circularly polarized light and convert the second circularly polarized light to third linearly polarized light; the third linearly polarized light is transmitted through the polarization splitting portion to form the plurality of first virtual images located in the plurality of first image surfaces;
the second image light transmission sub-portion comprises a second reflective surface and a second phase retarder, the second phase retarder is closer to the polarization splitting portion than the second reflective surface to the polarization splitting portion; the second phase retarder is configured to receive the second linearly polarized light emitted towards the second direction and convert the second linearly polarized light to third circularly polarized light; the second reflective surface is configured to reflect the third circularly polarized light and convert the third circularly polarized light to fourth circularly polarized light; the second phase retarder is further configured to receive the fourth circularly polarized light and convert the fourth circularly polarized light to fourth linearly polarized light; the fourth linearly polarized light is reflected by the polarization splitting portion to form the plurality of second virtual images located in the plurality of second image surfaces.

18. The near-eye display device according to claim 17, wherein a focal power of the first reflective surface is different from a focal power of the second reflective surface.

19. The near-eye display device according to claim 17, further comprising a transflective portion, wherein
the transflective portion is configured to transmit ambient light, the transflective portion comprises a first transflective sub-portion and a second transflective sub-portion, the first reflective surface is located between the first transflective sub-portion and the second transflective sub-portion,
a refractivity of the first transflective sub-portion is as same as a refractivity of the second transflective sub-portion.

* * * * *